US012708913B2

(12) United States Patent
Li et al.

(10) Patent No.: US 12,708,913 B2
(45) Date of Patent: Aug. 18, 2026

(54) ONE-BUTTON CONTROLLED WATER SPRAY GUN

(71) Applicant: ZhongShan Qing Yi Metal Products Enterprise CO., LTD, ZhongShan City (CN)

(72) Inventors: Shulong Li, ZhongShan City (CN); Kunguang Wu, ZhongShan City (CN); Jizhong Wang, ZhongShan City (CN); Tang Chieh Yu, Taichung City (TW)

(73) Assignee: ZHONGSHAN QINGYI METAL PRODUCTS ENTERPRISE CO., LTD., Zhongshan City (CN)

( * ) Notice: Subject to any disclaimer, the term of this patent is extended or adjusted under 35 U.S.C. 154(b) by 0 days.

(21) Appl. No.: 19/026,326

(22) Filed: Jan. 16, 2025

(65) Prior Publication Data

US 2026/0199913 A1 Jul. 16, 2026

(51) Int. Cl.
*B05B 1/16* (2006.01)
*B05B 1/18* (2006.01)

(52) U.S. Cl.
CPC .......... *B05B 1/1627* (2013.01); *B05B 1/1681* (2013.01); *B05B 1/1882* (2025.08)

(58) Field of Classification Search
CPC ... B05B 1/1627; B05B 1/1681; B05B 1/1654; B05B 1/3026; B05B 1/169; B05B 1/1645; B05B 12/002; B05B 9/01; B05B 1/30–326; B05B 1/1882
USPC ...... 251/230, 89–116; 74/111–169; 239/583, 239/456, 390–397, 525–528
See application file for complete search history.

(56) References Cited

U.S. PATENT DOCUMENTS

| | | | | | |
|---|---|---|---|---|---|
| 2,285,655 | A | * | 6/1942 | Heinemann | F16K 21/14 251/321 |
| 2,710,736 | A | * | 6/1955 | Miller | F16K 21/10 251/285 |
| 2,991,945 | A | * | 7/1961 | Rosenkranz | B05B 12/0022 251/114 |
| 3,220,695 | A | * | 11/1965 | Jones | E03C 1/23 4/689 |
| 3,278,093 | A | * | 10/1966 | Lehmann | B65D 83/546 222/401 |
| 3,389,886 | A | * | 6/1968 | Tissot-Dupont | F16K 31/363 251/75 |

(Continued)

FOREIGN PATENT DOCUMENTS

CN 220759627 U 4/2024

*Primary Examiner* — Craig J Price
(74) *Attorney, Agent, or Firm* — Bradley J. Thorson; DeWitt LLP

(57) ABSTRACT

A one-button controlled water spray gun has a switching valve unit configured for controlling the flow of water and a button unit configured for controlling operation of the switching valve unit. The button unit includes a first button and a second button that are arranged in the same axial direction to lean again each other. A first elastic member is provided between the first button and the switching valve unit. A pusher is provided on an outer periphery of the first button and is spaced apart from the second button. A second elastic member is provided between the pusher and the switching valve unit. In the process of pressing and moving the second button, different pressing resistances are provided in sections according to the pressing distance, thereby providing a good operating feel.

7 Claims, 7 Drawing Sheets

(56) References Cited

U.S. PATENT DOCUMENTS

| | | | | | |
|---|---|---|---|---|---|
| 3,710,827 | A * | 1/1973 | Skitch | F16K 11/202 | 137/637.4 |
| 4,956,755 | A * | 9/1990 | Maglica | F21V 31/00 | 362/206 |
| 5,421,552 | A * | 6/1995 | Wang | E03C 1/052 | 251/295 |
| 5,979,800 | A * | 11/1999 | Takagi | B05B 1/308 | 239/440 |
| 6,000,626 | A * | 12/1999 | Futo | A46B 11/066 | 239/526 |
| 6,076,747 | A * | 6/2000 | Ming-Yuan | B05B 1/169 | 239/383 |
| 6,247,654 | B1 * | 6/2001 | Kuo | A62C 31/03 | 239/443 |
| 6,254,016 | B1 * | 7/2001 | Chao | B05B 15/65 | 285/361 |
| 6,276,659 | B1 * | 8/2001 | Wang | F16K 21/10 | 251/230 |
| 6,352,212 | B1 * | 3/2002 | Wang | B05B 1/3013 | 239/526 |
| 6,471,145 | B1 * | 10/2002 | Huang | B05B 1/3026 | 239/525 |
| 6,634,570 | B2 * | 10/2003 | Scherer | B05B 7/1209 | 239/419 |
| 6,662,978 | B2 * | 12/2003 | Lin | B65D 41/28 | 222/509 |
| 6,685,110 | B2 * | 2/2004 | Wang | F16K 7/16 | 239/525 |
| 7,311,155 | B2 * | 12/2007 | Chang | B25F 5/00 | 173/104 |
| 7,370,814 | B2 * | 5/2008 | Chih | B05B 15/628 | 239/394 |
| 7,475,834 | B2 * | 1/2009 | Huang | B05B 12/0026 | 239/582.1 |
| 7,497,416 | B2 * | 3/2009 | Wang | A47C 27/081 | 137/232 |
| 7,527,239 | B2 * | 5/2009 | Mau | F16K 1/12 | 239/596 |
| 8,226,314 | B2 * | 7/2012 | Lee | B43K 29/002 | 401/99 |
| 8,313,049 | B2 * | 11/2012 | Xu | B05B 1/18 | 239/443 |
| 8,376,316 | B2 * | 2/2013 | Gustafson | F16K 21/06 | 251/47 |
| 8,424,781 | B2 * | 4/2013 | Rosko | B05B 1/3013 | 239/528 |
| 8,695,629 | B2 * | 4/2014 | Hsiao | G05D 16/0691 | 137/505.46 |
| 9,174,226 | B2 * | 11/2015 | Su | B05B 1/1654 | |
| 9,267,608 | B2 * | 2/2016 | Dutheil | F16K 21/10 | |
| 10,232,386 | B1 * | 3/2019 | Lu | F16K 11/0743 | |
| 10,536,066 | B2 * | 1/2020 | Lin | H02K 7/1853 | |
| 11,406,992 | B2 * | 8/2022 | Wang | B05B 1/3013 | |
| 11,433,406 | B2 * | 9/2022 | Lin | B05B 1/1654 | |
| 11,499,648 | B2 * | 11/2022 | Pávics | F16K 31/44 | |
| 11,642,684 | B2 * | 5/2023 | Cheng | B05B 1/3013 | 239/583 |
| 2011/0017933 | A1 * | 1/2011 | Kuo | E03C 1/0404 | 239/24 |
| 2012/0012676 | A1 * | 1/2012 | Hu | B05B 1/1663 | 239/525 |
| 2022/0118465 | A1 * | 4/2022 | Zhang | B05B 9/08 | |
| 2022/0143630 | A1 * | 5/2022 | Hong | B05B 1/18 | |
| 2024/0131517 | A1 * | 4/2024 | Kim | G01N 21/94 | |
| 2024/0133166 | A1 * | 4/2024 | Schlueter | B05B 1/18 | |

* cited by examiner

ONE-BUTTON CONTROLLED WATER SPRAY GUN

FIELD OF THE INVENTION

The present invention relates to a water spray gun, and more particularly, to a one-button controlled water spray gun.

BACKGROUND OF THE INVENTION

In the process of spraying or cleaning, conventional water spray guns need to be switched on/off frequently according to the user's actual needs or to be switched for different spray patterns, such as from a concentrated water jet to a diffused spray pattern. In use, the user has to grasp the water spray gun with one hand to spray water and the other hand to operate the switch and the spray pattern adjustment unit on the water spray gun. However, in many cases, the user may need to have one hand free to hold or manipulate the object being cleaned or to take other cleaning tools at the same time. This makes it impossible to use both hands to control the water spray gun, so the conventional water spray gun is still inconvenient for operation.

For example, a water spray gun structure disclosed in Chinese Utility Model Publication No. CN220759627U filed by the applicant of this application adopts a single button to integrate multiple control functions. By controlling the length of the pressing stroke of the button, the user can switch the water spray gun on/off or switch different spray patterns. Although it improves the convenience of operation to a certain extent, the button provided by the foregoing patent provides a single pressing resistance in actual use, which results in a poor operating feel. It is difficult for the user to accurately determine whether the button has been pressed to the corresponding switching position by the feel of the hand, which leads to operational errors and leaves room for improvement.

SUMMARY OF THE INVENTION

The primary object of the present invention is to provide a one-button controlled water spray gun, which provides a good operating feel.

In order to achieve the foregoing object, the present invention provides a one-button controlled water spray gun, having an outer casing. An inner pipe and a water pipe connected to the inner pipe are provided in the outer casing. A front end of the inner pipe has a spray pattern adjustment unit. A rear end of the inner pipe has a switching valve unit configured for switching the inner pipe to be in communication with the water pipe and a button unit configured for controlling operation of the switching valve unit.

The button unit includes a first button and a second button that are arranged in a front-to-back configuration in a same axial direction. A first elastic member is provided between the first button and the switching valve unit. One end of the first elastic member is configured to push the first button for the first button to lean against the second button. A pusher is provided on an outer periphery of the first button. The pusher is opposite to and spaced apart from the second button. A second elastic member is provided between the pusher and the switching valve unit. One end of the second elastic member leans against the pusher. Another end of the second elastic member leans against a rear end of the switching valve unit. When the second button is pressed to move toward the pusher, the second button drives the first button to move forward and press against the first elastic member to generate a first pressing resistance. When the second button is pressed against the pusher to push the first button and the pusher to move toward the switching valve unit, the pusher is pressed against the second elastic member to further generate a second pressing resistance.

Preferably, the button unit further includes a sleeve connected to the rear end of the switching valve unit. An actuating disc, the first elastic member and a front end of the first button are sequentially disposed inside the sleeve in a front-to-back direction. A locking member is provided between the first button and the first elastic member. One end of the first elastic member elastically leans against the locking member and the other end of the first elastic member elastically leans against the actuating disc, so that the locking member is pushed by the first elastic member to abut against the front end of the first button. When the first button is pushed forward by the second button, the locking member is pushed forward synchronously to force the first elastic member to push the actuating disc and the plug to move. A first locking groove and a second locking groove are formed on an inner wall of the sleeve. The first locking groove and the second locking groove are spaced apart from each other and located at different depths of the sleeve. The locking member has a protrusion formed on an outer periphery of the locking member. The protrusion is located in the first locking groove. The front end of the first button is formed with a toothed portion. One side of the protrusion, facing the toothed portion, forms an inclined surface to engage with the toothed portion. When the locking member is pushed forward by a distance greater than a spacing distance between the second button and the pusher, the protrusion on the locking member is rotated into the second locking groove, such that the locking member is kept in a forward protruding locking position.

DETAILED DESCRIPTION OF THE PREFERRED EMBODIMENTS

Figure 1:
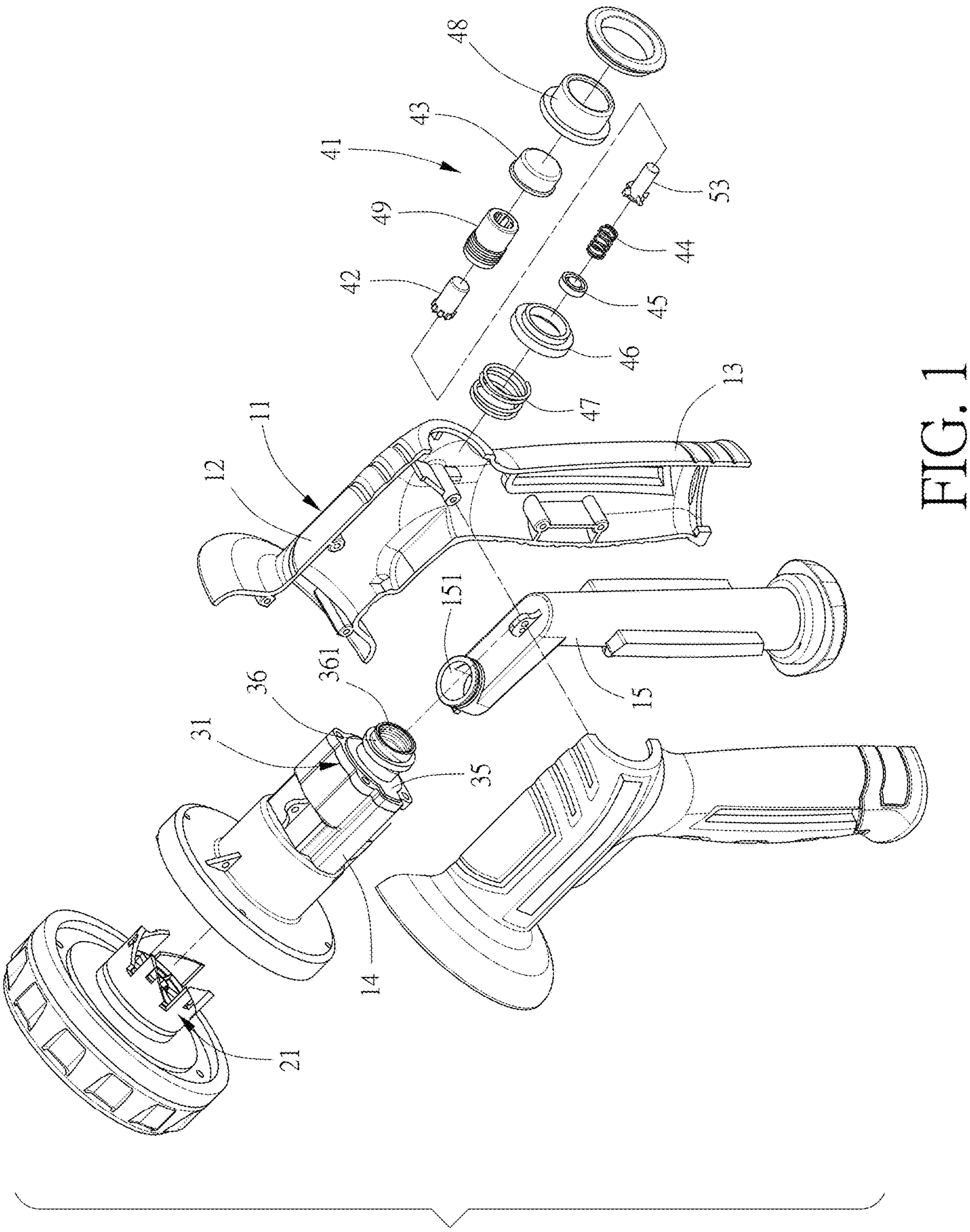
FIG. 1 is an exploded view of the present invention.
Figure 2:
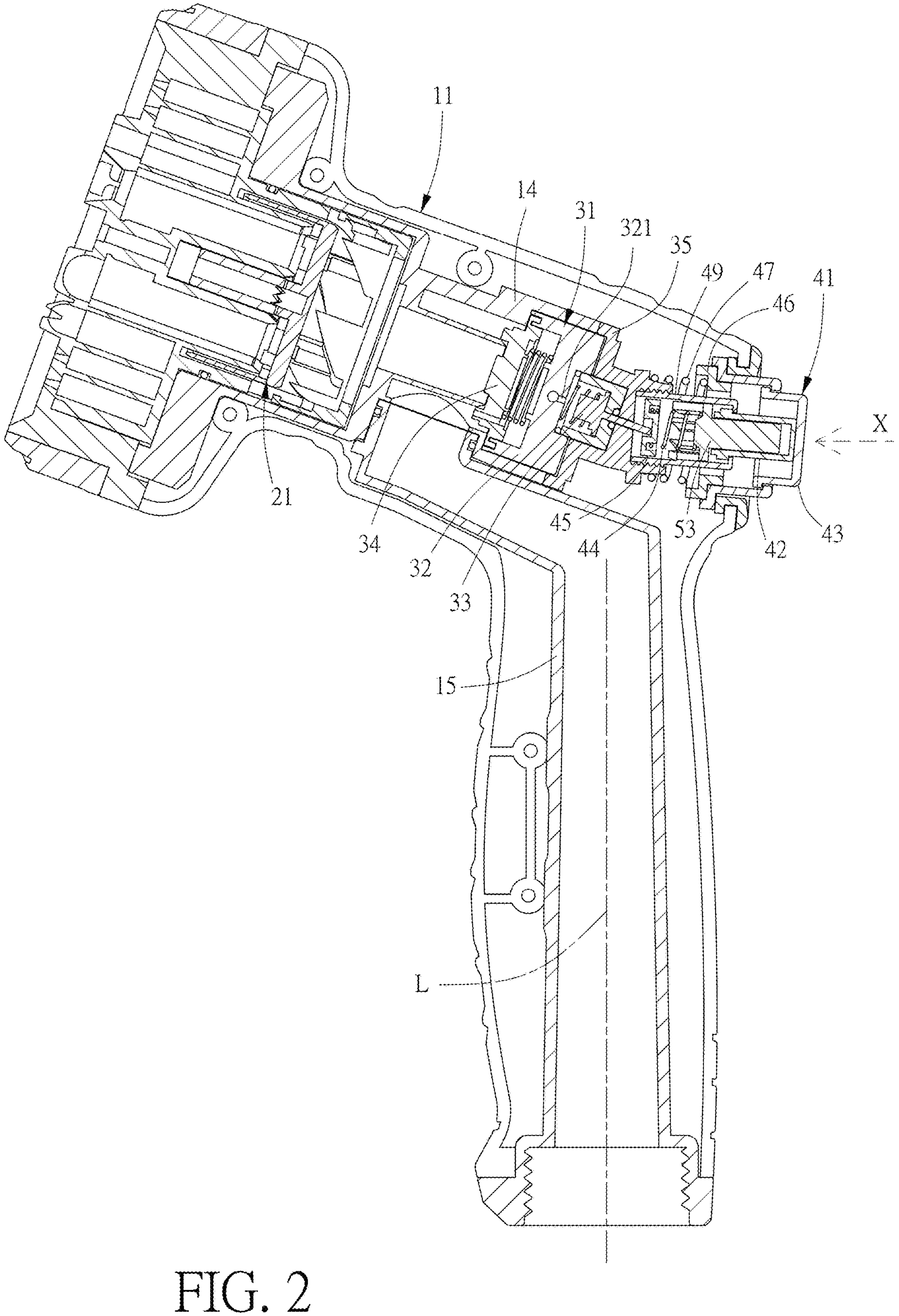
FIG. 2 is a cross-sectional view of the present invention.

As shown in FIG. 1 through FIG. 7, the present invention discloses a one-button controlled water spray gun, comprising a generally L-shaped outer casing 11. The outer casing 11 has a barrel section 12 and a grip section 13 for a user to grasp. An inner pipe 14 is provided in the barrel section 12. A water pipe 15 is provided in the grip section 13. The upper end of the water pipe 15 has a water inlet 151. The water inlet 151 of the water pipe 15 is connected to the inner pipe 14. The lower end of the water pipe 15 is configured for connecting a water supply source such as a tap water pipe (not shown in the drawings, enabling external water to flow into the inner pipe 14 via the water inlet 151. The front end of the inner pipe 14 is connected to a spray pattern adjustment unit 21. The rear end of the inner pipe 14 is connected to a switching valve unit 31 configured for switching the inner pipe 14 to be in communication with the water pipe 15. The rear end of the switching valve unit 31 is connected to a button unit 41 configured for controlling the operation of the switching valve unit 31.

The switching valve unit 31 has a valve seat 32 and a plug 33. A valve plate 34 is provided on one side of the valve seat 32, facing the inner pipe 14. The valve plate 34 is configured for closing the rear end of the inner pipe 14. The valve seat 32 has a pressure relief hole 321. The plug 33 is opposite to and spaced apart from the pressure relief hole 321. When the plug 33 is pushed, the pressure relief hole 321 will be closed by the plug 33, thereby changing the internal water pressure of the inner pipe 14, such that the valve plate 34 is moved according to the change in the water pressure of the inner pipe 14 for switching the inner pipe 14 to be in communication with the water pipe 15. The spray pattern adjustment unit 21 automatically changes the spray pattern of water to be sprayed out under the impact of the water flowing into the inner pipe 14 each time. The assembly and operating principle of the switching valve unit 31 and the spray pattern adjustment unit 21 have been disclosed in Chinese Utility Model Publication No. CN220759627U, so the detailed structure will not be described hereinafter.

The button unit 41 is insertedly connected to the rear end of the barrel section 12. The button unit 41 includes a first button 42 and a second button 43 that are arranged in a front-to-back configuration in the same axial direction. The second button 43 extends out of the rear end of the barrel section 12 for the user to press thereon. In this embodiment, the button unit 41 defines a pressing direction X for the user to press the button unit 41. The pressing direction X is arranged at 90 degrees to the vertical center line L of the grip section 13, such that the user can grasp the grip section 13 with one hand and press the second button 43 with his/her thumb to operate the water spray gun more smoothly.

A first elastic member 44 is provided between the first button 42 and the switching valve unit 31. One end of the first elastic member 44 is configured to push the first button 42, so that the first button 42 is pushed by the first elastic member 44 to lean against the second button 43. The other end of the first elastic member 44 leans against an actuating disc 45. The actuating disc 45 and the plug 33 are in contact with each other, so that the plug 33 can be pushed by the actuating disc 45 to relatively close the pressure relief hole 321. A pusher 46 is provided on the outer periphery of the first button 42. The pusher 46 is opposite to and spaced apart from the second button 43. A second elastic member 47 is provided between the pusher 46 and the switching valve unit 31. One end of the second elastic member 47 leans against the pusher 46, and the other end of the second elastic member 47 leans against the rear end of the switching valve unit 31. To prevent the second button 43 from detaching from the opening of the rear end of the barrel section 12, a restricting sleeve 48 is provided at the opening of the rear end of the barrel section 12 for insertion of the second button 43. The front end of the restricting sleeve 48, facing the pusher 46, is formed with a contact surface 481 for the pusher 46 to lean against the contact surface 481. A first protruding portion 482 is formed on the inner wall of the rear end of the restricting sleeve 48. A second protruding portion 431 is formed on the periphery of the front end of the second button 43. The second protruding portion 431 is engagable with the first protruding portion 482.

With the assembly of the above-mentioned structure, when the second button 43 is pressed to move toward the pusher 46, the second button 43 will drive the first button 42 to press against the first elastic member 44 to generate a first pressing resistance. When the second button 43 is pressed against the pusher 46 to push the first button 42 and the pusher 46 to move toward the switching valve unit 31, the pusher 46 will press against the second elastic member 47 to additionally generate a second pressing resistance.

Figure 3:
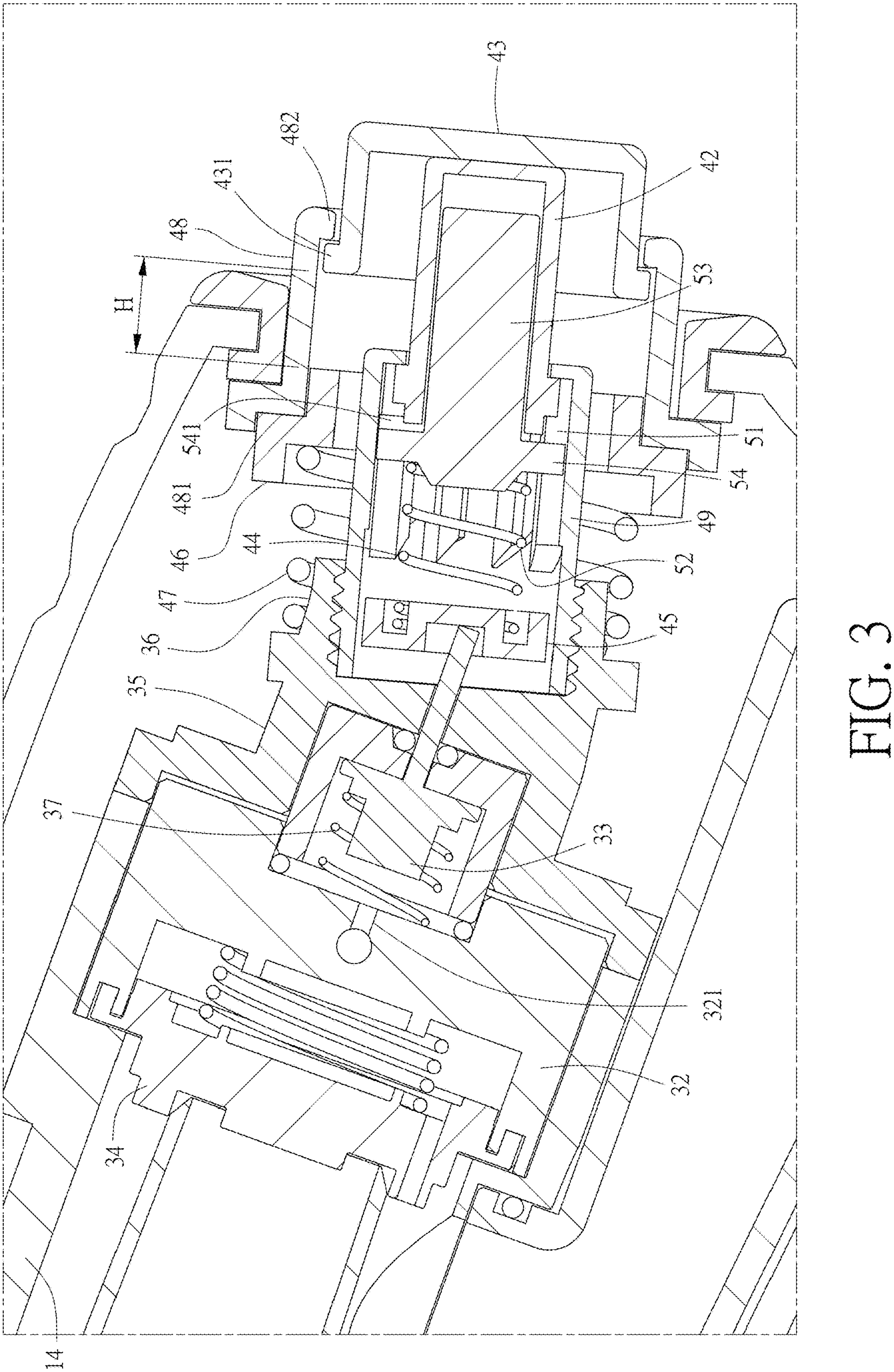
FIG. 3 is a partial enlarged view of FIG. 2.
Figure 4:
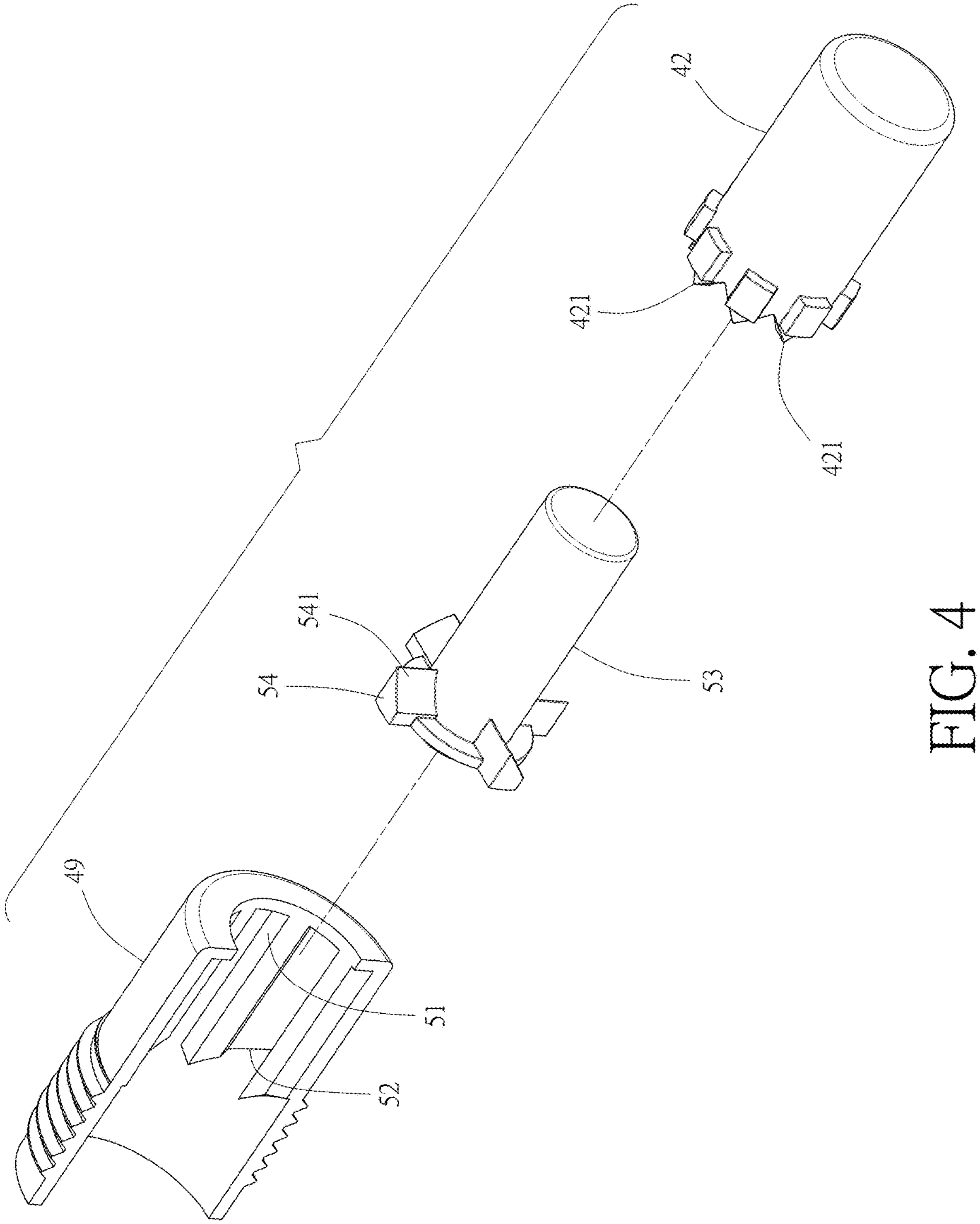
FIG. 4 is an exploded view of a sleeve, a locking member and a first button of the present invention.
Figure 5:
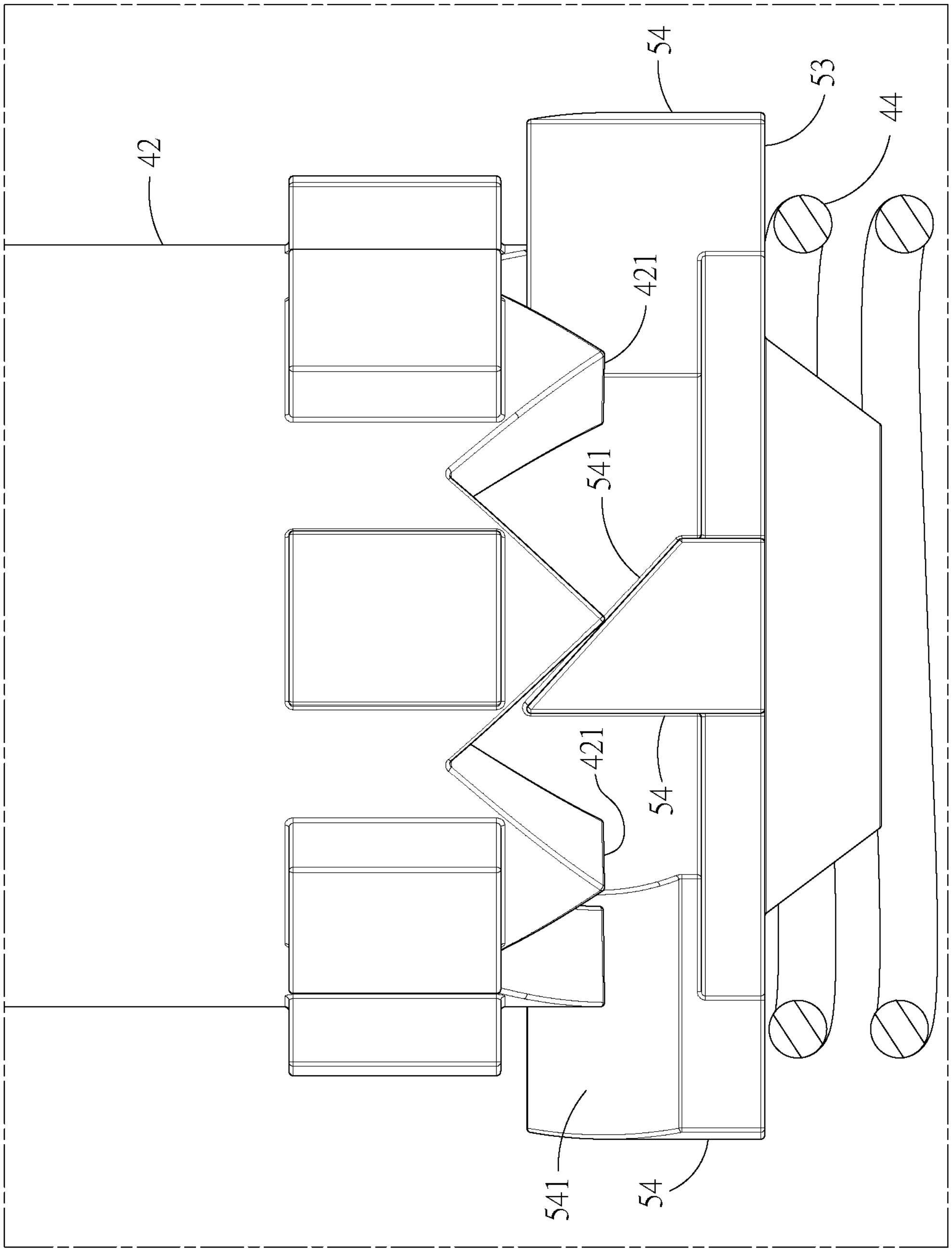
FIG. 5 is a partially enlarged view of the assembled state of a first elastic member, a locking member and a first button of the present invention.

The button unit 41 further includes a sleeve 49 connected to the rear end of the switching valve unit 31. In this embodiment, the switching valve unit 31 has a rear cover 35 disposed rearward of the switching valve unit 31. The rear cover 35 is formed with an interface portion 36. The front end of the sleeve 49 is threadedly connected to a threaded section 361 in the interface portion 36, which has the advantage of being easily assembled and disassembled. The actuating disc 45, the first elastic member 44 and the front end of the first button 42 are sequentially disposed inside the sleeve 49 in a front-to-back direction. A first locking groove 51 and a second locking groove 52 are formed on the inner wall of the sleeve 49. The first locking groove 51 and the second locking groove 52 are spaced apart from each other and located at different depths of the sleeve 49. As shown in FIG. 3 and FIG. 5, a locking member 53 is provided between the first button 42 and the first elastic member 44. One end of the first elastic member 44 elastically leans against the locking member 53, and the other end of the first elastic member 44 elastically leans against the actuating disc 45, such that the locking member 53 is pushed by the first elastic member 44 to abut against the front end of the first button 42. When the first button 42 is pushed forward by the second button 43, the locking member 53 will be pushed forward synchronously to force the first elastic member 44 to push the actuating disc 45 and the plug 33 to move. The locking member 53 has a protrusion 54 formed on the outer periphery of the locking member 53. The protrusion 54 is located in the first locking groove 51. In this embodiment, the front end of the first button 42 is formed with a triangular toothed portion 421. One side of the protrusion 54, facing the toothed portion 421, forms an inclined surface 541 to engage with the toothed portion 421. When the first button 42 pushes the locking member 53 to move forward, the locking member 53 will be rotated by the guidance provided by the inclined surface 541. When the locking member 53 is pushed forward by a distance greater than the spacing distance H between the second button 43 and the pusher 46, the protrusion 54 on the locking member 53 will be relatively rotated into the second locking groove 52, such that the locking member 53 is kept in a forward protruding locking position to force the first elastic member 44 to continue to push against the actuating disc 45 and the plug 33 for the plug 33 to be in a state of closing the pressure relief hole 321 (that is, the water spray gun is in an OFF state). When the locking member 53 is in the locked position, it is only necessary to press the second button 43 again and make its pressing stroke greater than the spacing distance H between the second button 43 and the pusher 46, so that the locking member 53 is driven to move forward again and the protrusion 54 is rotated into the first locking groove 51 again, thereby releasing the plug 33 from closing the pressure relief hole 321 (that is, the water spray gun is in an ON state).

In actual use, through the arrangement of the first elastic member 44 and the second elastic member 47, the water spray gun provided by the present invention allows users to experience two different pressing sensations during the pressing stroke of the button unit 41, depending on the pressing distance. This effectively enhances the operational feel, as described below.

Figure 6:
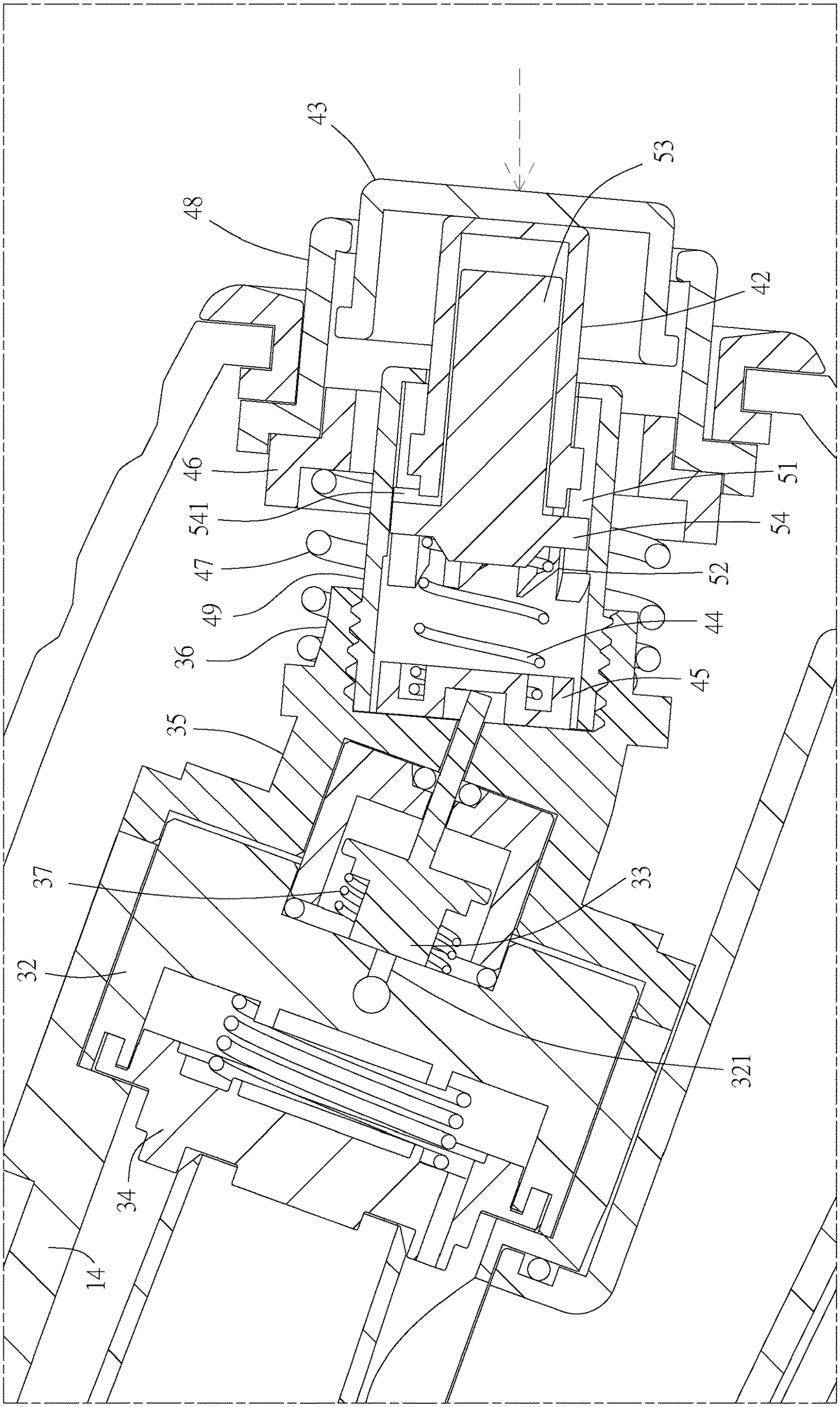
FIG. 6 is a schematic view of the present invention in use, illustrating the operation of the present invention at a first pressing distance.

As shown in FIG. 6, the user presses the second button 43 to relatively push the first button 42 and the locking member 53 forward (i.e., toward the switching valve unit 31). When the pressing distance of the second button 43 pressed by the user is not greater than the spacing distance H between the second button 43 and the pusher 46, the second button 43 cannot yet move the pusher 46. At this time, the user only needs to overcome the first pressing resistance generated by the first elastic member 44 to push the first button 42 and the locking member 53 forward, such that the first elastic member 44 pushes the actuating disc 45 and the plug 33 to relatively close the pressure relief hole 321. Since the locking member 53 is not pushed far enough to form a locking state, when the hand is released and no more force is exerted, the plug 33 will be returned to its position by the third elastic member 37. During this temporary closure of the pressure relief hole 321, the spray pattern adjustment unit 21 can be actuated to adjust the spray pattern by the change of water pressure in the inner pipe 14.

Figure 7:
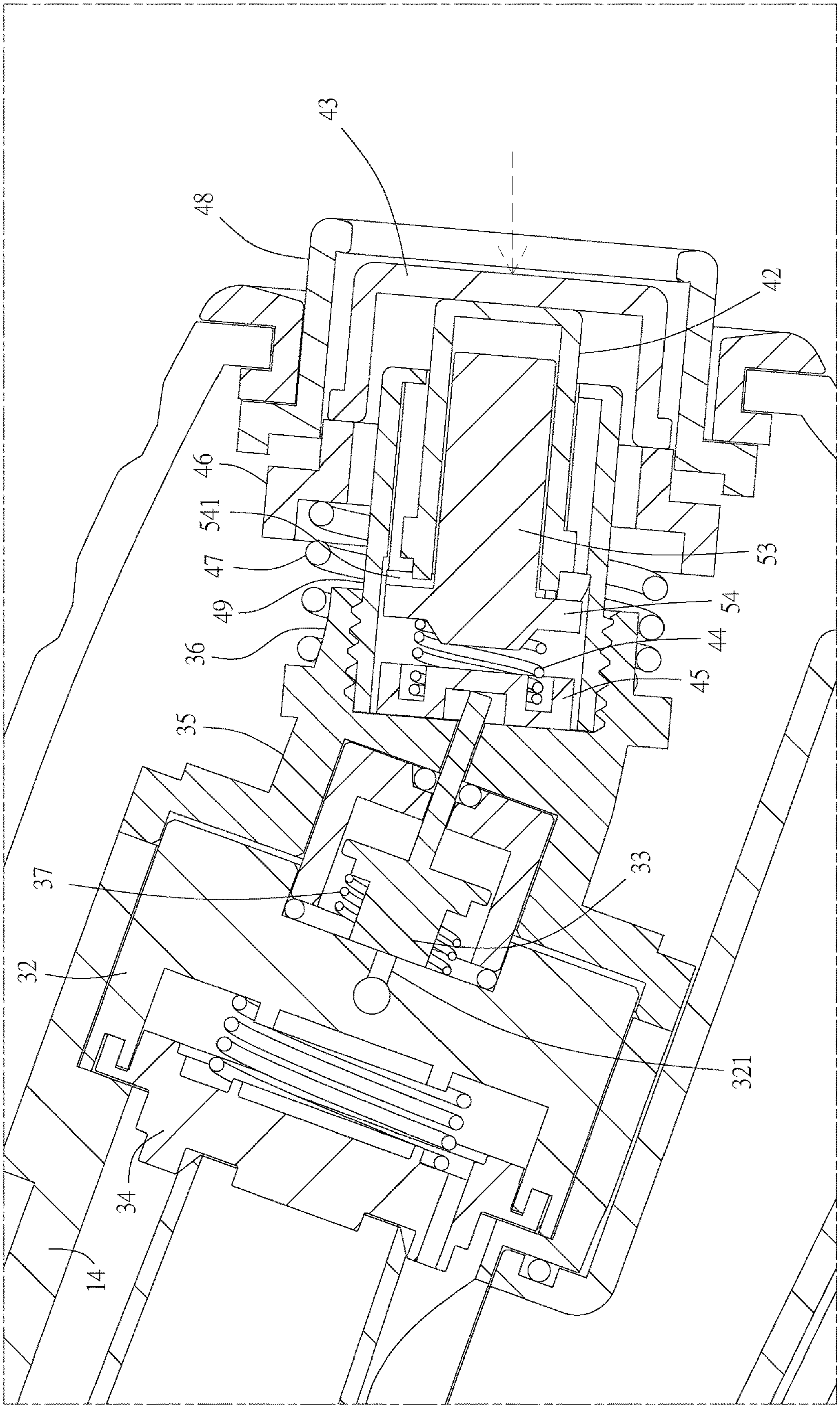
FIG. 7 is a schematic view of the present invention in use, illustrating the operation of the present invention at a second pressing distance.

As shown in FIG. 7, when the pressing distance of the second button 43 pressed by the user is greater than the spacing distance H between the second button 43 and the pusher 46, the second button 43 will push the pusher 46 to move toward the switching valve unit 31 after being in contact with the pusher 46. In the process of pressing the second button 43 to push the pusher 46, the user needs to overcome the first pressing resistance generated by the first elastic member 44 as well as the second pressing resistance generated by the second elastic member 47. That is, the user needs to apply a greater force, enabling the second button 43 to push the pusher 46 forward smoothly and then to drive the first button 42 and the locking member 53 to move forward more. When the pressing distance is greater than the spacing distance H between the second button 43 and the pusher 46, the protrusion 54 on the locking member 53 will be relatively rotated into the second locking groove 52, so that the locking member 53 is in a locked state. When the hand is released and no more force is exerted, the plug 33 will be in a state of closing the pressure relief hole 321, thereby achieving the operation to turn off the water spray gun.

As described above, the present invention achieves the functionality of one-button control for the ON/OFF state of the water spray gun and the adjustment of the spray pattern, enabling all operations to be completed with just one hand. Besides, through the interaction between the first elastic member 44 and the second elastic member 47, the button unit 41 provides two different pressing sensations according to the pressing distance. That is, the pressing resistance in the first stage of the operation to adjust the spray pattern is smaller, while the pressing resistance in the second stage of the operation to turn on/off the water spray gun is greater. This allows users to easily determine whether they have pressed the button unit to a specific operating position through the feedback of different operating sensations, which enhances the operating sensation greatly and reduces the number of errors effectively, making it highly practical.

The invention claimed is:

1. A one-button controlled water spray gun, having an outer casing, an inner pipe and a water pipe connected to the inner pipe being provided in the outer casing, a front end of the inner pipe having a spray pattern adjustment unit, a rear end of the inner pipe having a switching valve unit configured for switching the inner pipe to be in communication with the water pipe and a button unit configured for controlling operation of the switching valve unit, characterized in that:

the button unit includes a first button and a second button that are arranged in a front-to-back configuration in a same axial direction, a first elastic member is provided between the first button and the switching valve unit, one end of the first elastic member is configured to push the first button for the first button to lean against the second button, a pusher is provided on an outer periphery of the first button, the pusher is opposite to and spaced apart from the second button, a second elastic member is provided between the pusher and the switching valve unit, one end of the second elastic member leans against the pusher, and another end of the second elastic member leans against a rear end of the switching valve unit; when the second button is pressed to move toward the pusher, the second button drives the first button to move forward and press against the first elastic member to generate a first pressing resistance; when the second button is pressed against the pusher to push the first button and the pusher to move toward the switching valve unit, the pusher is pressed against the second elastic member to additionally generate a second pressing resistance.

2. The one-button controlled water spray gun as claimed in claim 1, wherein the outer casing has a barrel section and a grip section, the inner pipe is disposed in the barrel section, the water pipe is disposed in the grip section, the button unit is insertedly connected to a rear end of the barrel section, the second button extends out of the rear end of the barrel section for a user to press thereon, and a pressing direction of the button unit is arranged at 90 degrees to a vertical center line of the grip section.

3. The one-button controlled water spray gun as claimed in claim 1, wherein the outer casing has a barrel section and a grip section, the inner pipe is disposed in the barrel section, the water pipe is disposed in the grip section, the button unit is insertedly connected to a rear end of the barrel section, the second button extends out of the rear end of the barrel section for a user to press thereon, a restricting sleeve is provided at an opening of the rear end of the barrel section for insertion of the second button, a front end of the restricting sleeve, facing the pusher, is formed with a contact surface for the pusher to lean against the contact surface, a first protruding portion is formed on an inner wall of a rear end of the restricting sleeve, a second protruding portion is formed on a periphery of a front end of the second button, and the second protruding portion is engagable with the first protruding portion.

4. The one-button controlled water spray gun as claimed in claim 1, wherein the switching valve unit has a valve seat and a plug, a valve plate is provided on one side of the valve seat, facing the inner pipe, the valve plate is configured for closing the rear end of the inner pipe, the valve seat has a pressure relief hole, the plug is opposite to and spaced apart from the pressure relief hole, another end of the first elastic member leans against an actuating disc, the actuating disc and the plug are in contact with each other, when the plug is pushed by the actuating disc, the plug closes the pressure relief hole.

5. The one-button controlled water spray gun as claimed in claim 4, wherein the button unit further includes a sleeve connected to the rear end of the switching valve unit, the switching valve unit has a rear cover disposed rearward of the switching valve unit, the rear cover is formed with an interface portion, a front end of the sleeve is threadedly connected to a threaded section in the interface portion, and the actuating disc, the first elastic member and a front end of the first button are sequentially disposed inside the sleeve in a front-to-back direction.

6. The one-button controlled water spray gun as claimed in claim 5, wherein a locking member is provided between the first button and the first elastic member, one end of the first elastic member elastically leans against the locking member, and the other end of the first elastic member elastically leans against the actuating disc, so that the locking member is pushed by the first elastic member to abut against the front end of the first button, when the first button is pushed forward by the second button, the locking member is pushed forward synchronously to force the first elastic member to push the actuating disc and the plug to move.

7. The one-button controlled water spray gun as claimed in claim 6, wherein a first locking groove and a second locking groove are formed on an inner wall of the sleeve, the first locking groove and the second locking groove are spaced apart from each other and located at different depths of the sleeve, the locking member has a protrusion formed on an outer periphery of the locking member, the protrusion is located in the first locking groove, the front end of the first button is formed with a toothed portion, and one side of the protrusion, facing the toothed portion, forms an inclined surface to engage with the toothed portion, when the locking member is pushed forward by a distance greater than a spacing distance between the second button and the pusher, the protrusion on the locking member is rotated into the second locking groove, such that the locking member is kept in a forward protruding locking position.

* * * * *